US005787927A

United States Patent [19]
Johnson

[11] Patent Number: 5,787,927
[45] Date of Patent: Aug. 4, 1998

[54] COUPLING ASSEMBLY

[75] Inventor: Thomas F. Johnson, Foothill Ranch, Calif.

[73] Assignee: TA Mfg. Co., Glendale, Calif.

[21] Appl. No.: 604,339

[22] Filed: Feb. 21, 1996

[51] Int. Cl.$^6$ ................................................. F16L 37/28
[52] U.S. Cl. ........................... 137/614.03; 137/614.02;
137/899.2; 251/149.2; 251/212
[58] Field of Search .......................... 251/149.2, 212;
137/899.2, 614.04, 614.03, 614.02

[56] References Cited

U.S. PATENT DOCUMENTS

| | | | |
|---|---|---|---|
| 2,406,662 | 8/1946 | Burchett | 251/149.2 |
| 3,077,330 | 2/1963 | Lamphear | 251/149.2 |
| 3,127,148 | 3/1964 | Collar | 251/149.2 |
| 4,586,694 | 5/1986 | Jones | 251/149.2 |

*Primary Examiner*—A. Michael Chambers
*Attorney, Agent, or Firm*—Ellsworth R. Roston; Fulwider Patton Lee & Utecht, LLP

[57] ABSTRACT

Apparatus for coupling to an aircraft a high pressure air flow from ground equipment to start engines includes a hollow housing attachable to the ground equipment. A pair of members defining a first valve form a clamshell within the housing. Such members are biased to a closed relationship and are rotatable to an open relationship. A hollow coupling member includes a ring for rotating such valve members equally to the open relationship in response to incremental linear movements of the ring member. The coupling member receives a hollow start nipple in the aircraft. A pair of members defining a second valve form a clamshell rotatable within the housing in a direction opposite to the direction of the first clamshell rotation. The second valve members are biased to close such valve and are rotatable to an open relationship. The coupling member includes prongs which act linearly on the second valve members, in a manner similar to the ring action on the first valve members, to open such valve. Detents on the coupling member and on the start nipple maintain the valves open until the housing and the coupling member are removed from the start nipple. The start nipple configuration facilitates the removal of the coupling member and the housing from the start nipple. When the valves are opened, high pressure air flows from the ground equipment into the aircraft to start the engines. The synchronous operation of both valves provides additional assurance as to the proper operation of the apparatus.

39 Claims, 4 Drawing Sheets

COUPLING ASSEMBLY

This invention relates to a coupling assembly for introducing air under pressure into an aircraft to start the engines in the aircraft. More particularly, the invention relates to a single coupling member with a pair of redundant valves which prevent air under pressure from such ground equipment from being introduced into the aircraft until the simultaneous opening of such valves by such a single coupling member.

BACKGROUND OF THE INVENTION

In the past, apparatus has coupled ground equipment to an aircraft to provide for the introduction of air at a high pressure into the aircraft for starting the aircraft engines. In general, such apparatus has operated on a pushpull basis. In such operation, the apparatus has been pushed to engage an external coupling nipple on the aircraft. The apparatus has been pulled to engage its release from the external coupling nipple.

The apparatus of the prior art has included a valve which has restricted the flow of high pressure air when the apparatus has been decoupled from the external coupling nipple. The valve has accordingly acted as a safety mechanism to prevent the apparatus and the hose extending from the ground equipment from causing damage or injury if and when the apparatus has become uncoupled during use or if and when the apparatus has become uncoupled while the ground equipment has continued to supply high pressure.

U.S. Pat. No. 4,586,694 issued to Kendall Jones on May 6, 1986, for a "Coupling Assembly" and assigned of record to the assignee of record of this application discloses and claims apparatus for overcoming the disadvantages specified in the previous paragraph. The apparatus disclosed and claimed in such patent includes the push-to-engage and the pull-to-release action of the prior art apparatus but includes a reduced number of parts, significantly increased air flow and enhanced resistance to handling damage. As a result, the repairable service life of such apparatus is increased and overhaul is simplified and made economical.

The apparatus of U.S. Pat. No. 4,586,694 incorporates an improved flow restriction valve which closes automatically upon disengagement of the apparatus from the aircraft. The apparatus of U.S. Pat. No. 4,586,694 also provides for an enhanced and smooth airflow of high pressure through the valve to the aircraft. The valve of U.S. Pat. No. 4,586,694 provides for the flow of the high pressure air through the valve to the aircraft with no restrictions in such air flow and with the substantial elimination of any standing waves which would tend to reduce the airflow.

In one embodiment of the invention, apparatus for coupling to an aircraft a high pressure air flow from ground equipment to start engines includes a hollow housing attachable to the ground equipment. A pair of members defining a first valve form a clamshell within the housing. Such members are biased to a closed relationship and are rotatable to an open relationship.

A hollow coupling member includes a ring for rotating such valve members equally to the open relationship in response to incremental linear movements of the ring member. The coupling member receives a hollow start nipple in the aircraft. A pair of members defining a second valve form a clamshell rotatable within the housing in the closed position in a direction opposite to the direction of the first clamshell rotation. The second valve members are biased to close such valve and are rotatable to an open relationship.

The coupling member includes prongs which act linearly on the second valve members, in a manner similar to the action of the ring on the first valve members, to open such valve. Detents on the coupling member and on the start nipple maintain the valves open until the housing and the coupling member are removed from the start nipple.

The configuration of the start nipple facilitates the removal of the coupling member and the housing from the start nipple. When the valves are opened, high pressure air flows from the ground equipment into the aircraft to start the engines. The synchronous operation of both valves provides additional assurance as to the proper operation of the apparatus.

DETAILED DESCRIPTION OF THE INVENTION

The apparatus of this invention constitutes an improvement of the apparatus disclosed and claimed in U.S. Pat. No. 4,586,694 issued to Kendall Jones on May 6, 1986, for a "Coupling Assembly" and assigned of record to the assignee of record of this application. U.S. Pat. No. 4,586,694 is accordingly to be used in completing the disclosure of the invention in this application if any such reference to U.S. Pat. No. 4,586,694 is deemed to be necessary.

Figure 1:
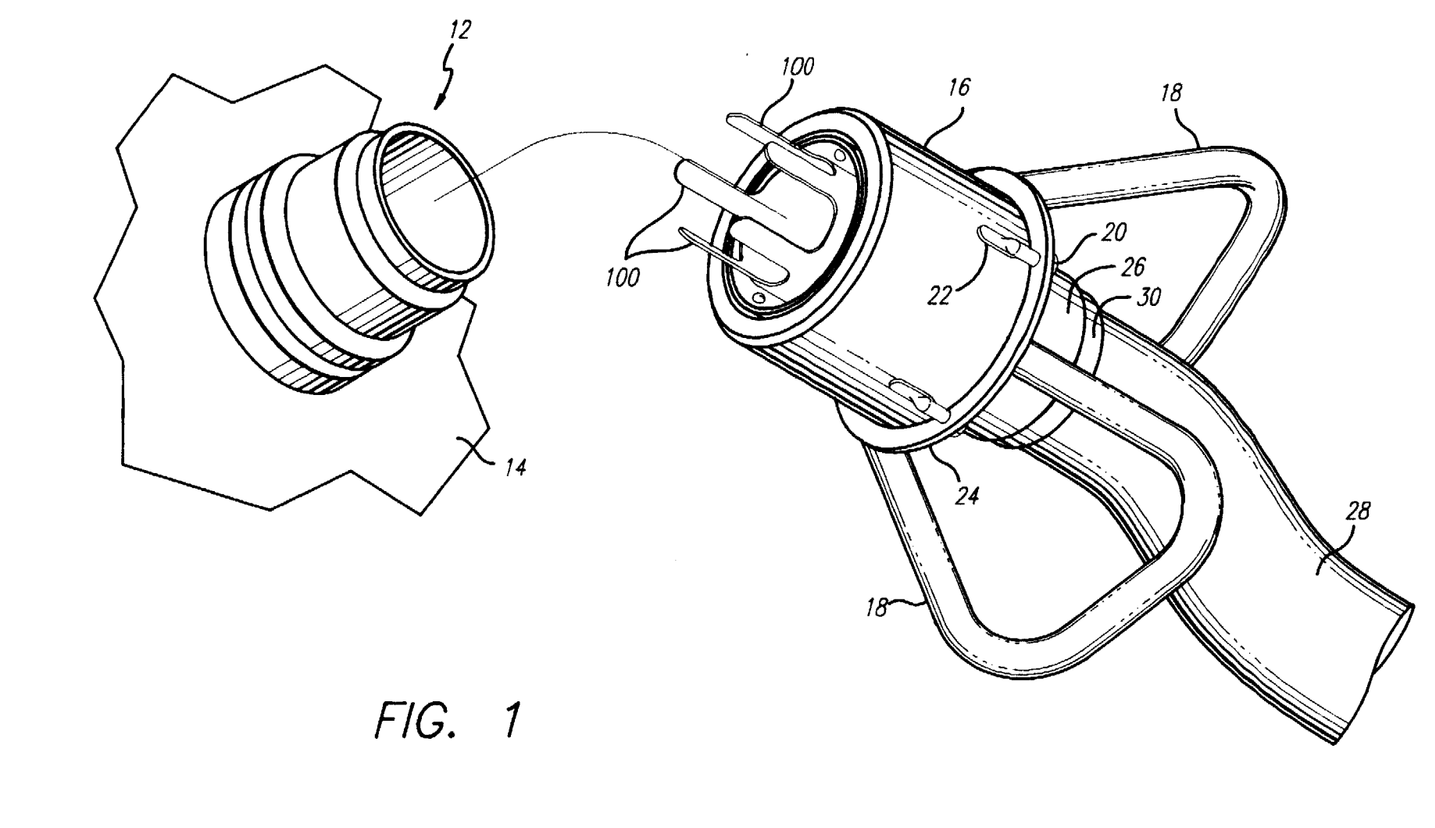
FIG. 1 is a fragmentary perspective view of a valve assembly constituting one embodiment of the invention and shows the valve assembly in an exploded relationship.

In FIG. 1, a coupling assembly generally indicated at 10 and constructed in accordance with the teachings of the present invention is shown adjacent an external nipple generally indicated at 12. The external nipple 12 is positioned to extend from an aircraft 14. The nipple 12 is of a standard size and is generally referred to as a start nipple and is found on most turbo-jet powered aircraft. The coupling assembly 10 is designed to mate with the start nipple 12 and is of the type generally referred to as a push-to-engage and pull-to-release coupling.

The coupling assembly 10 includes an outer slidable collar 16 which encloses the locking portion of the coupling assembly 10. A pair of handles 18 extend from a ring 24 when the ring 24 is connected to the collar 16 by nuts 20 which lock on bolts 22 welded to the collar 16. The bolts 22 pass through openings in the ring 24.

A housing 26 extends from the collar 16. The housing 26 contains and supports a valve assembly generally indicated at 25. In addition, a flexible air hose 28 (FIG. 1) is coupled at the end of the housing 26 through the use of a locking member 30 as shown in FIG. 1.

Figure 2:
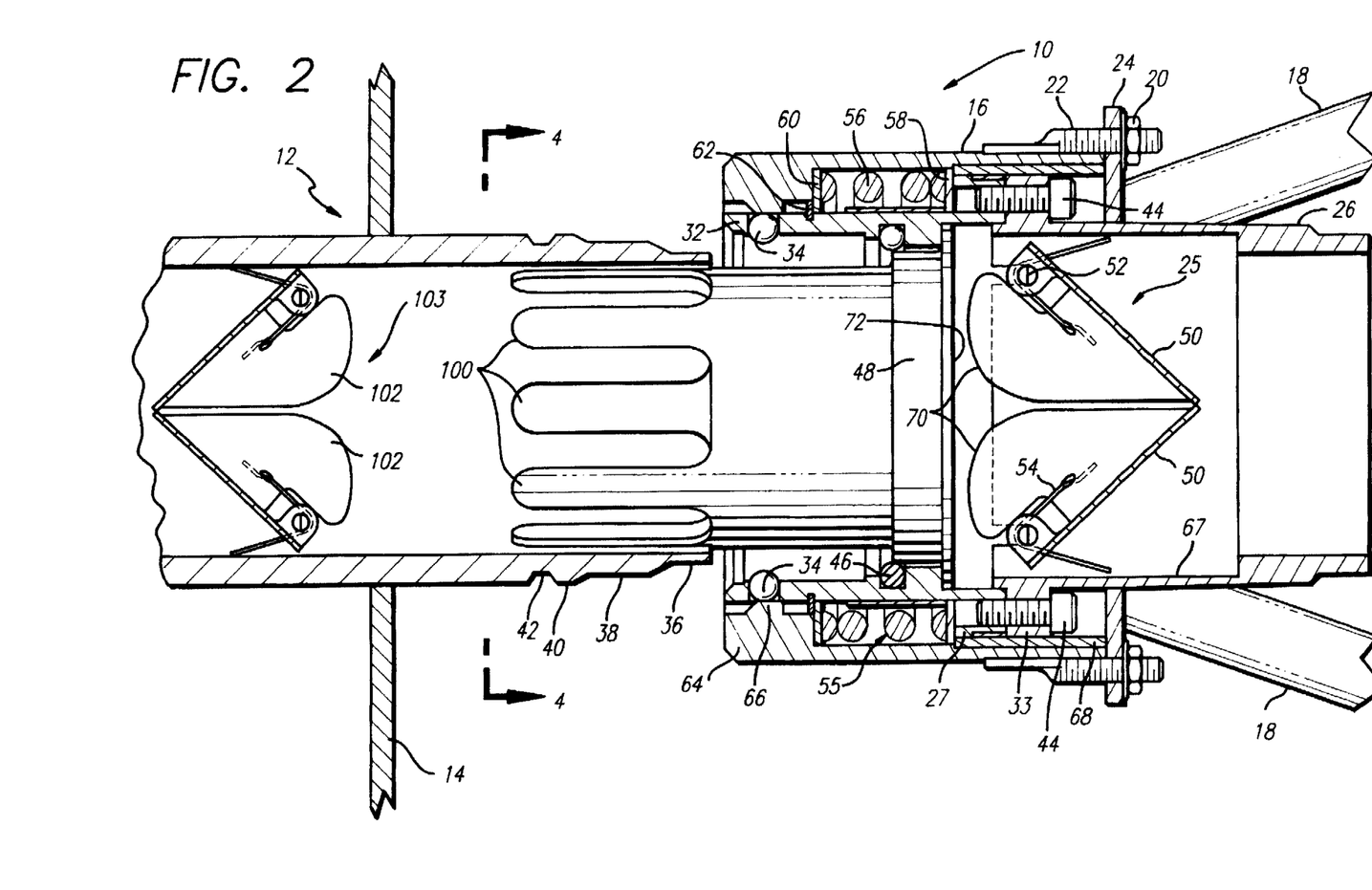
FIG. 2 is a sectional view of the valve assembly shown in FIG. 1 and shows the valves in the valve assembly in a closed relationship.
Figure 3:
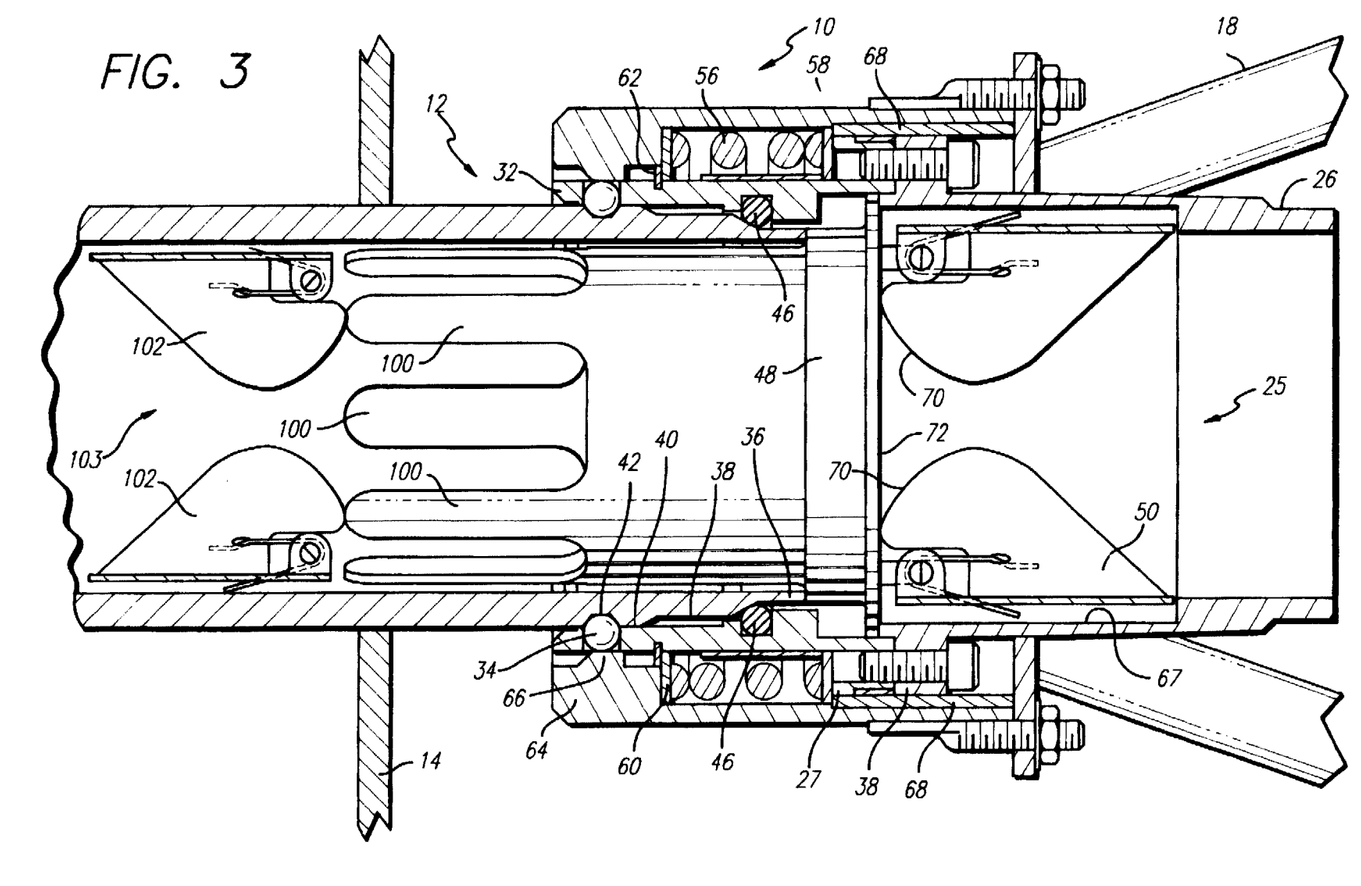
FIG. 3 is a sectional view of the valve assembly similar to that shown in FIG. 2 and shows the valves in the valve assembly in an open relationship.
Figure 4:
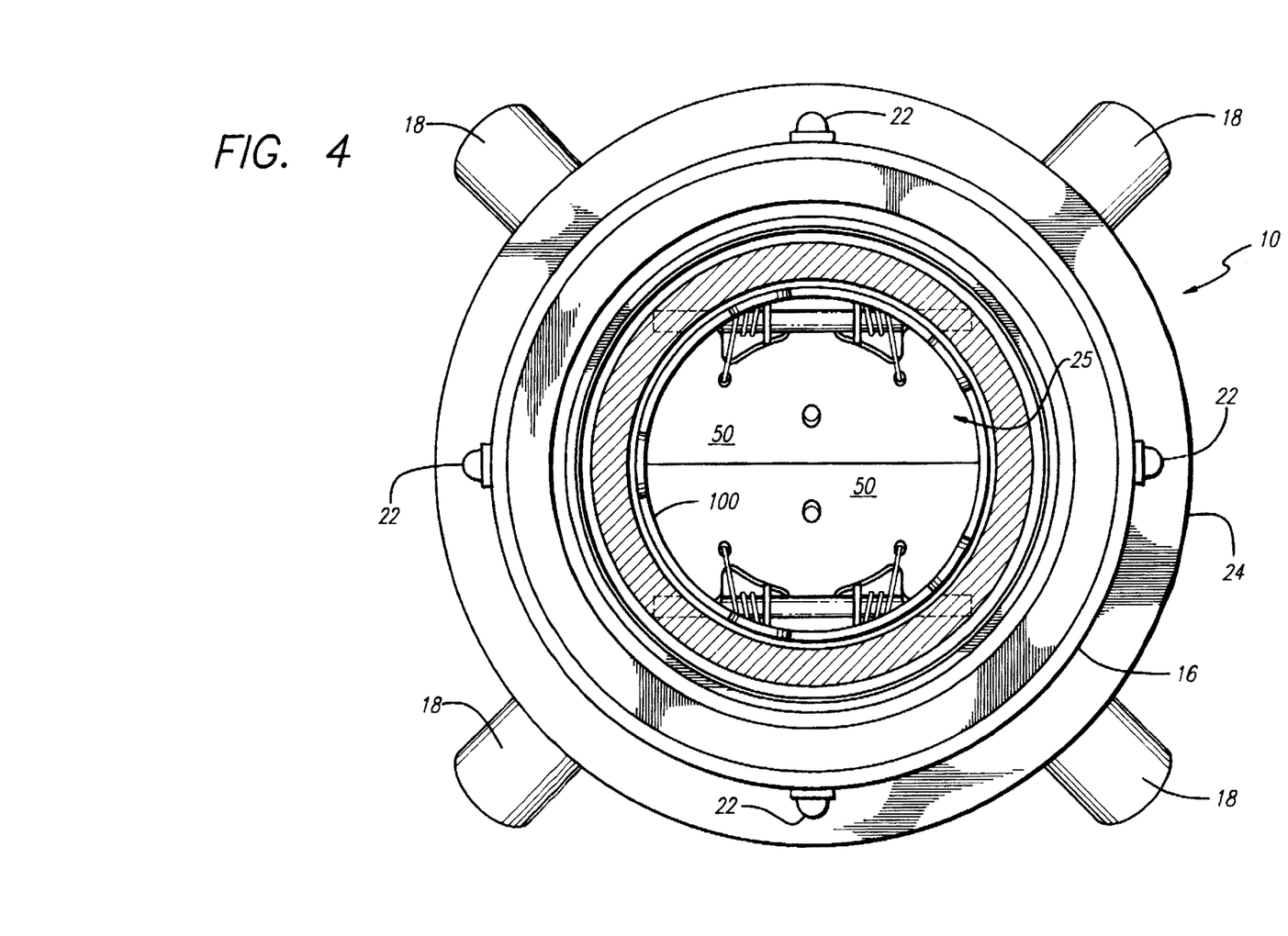
FIG. 4 is a sectional view of the valve assembly and is taken substantially on the line 4—4 of FIG. 2.

At the open end of the coupling assembly 10 and located within the collar 16, a coupling member 32 (FIGS. 2 and 3) is designed to engage the start nipple 12. The coupling member 32 receives and supports a plurality of locking balls 34. FIGS. 2 and 3 illustrate the interior of the coupling assembly 32 in additional detail and FIG. 4 illustrates details of the vanes located within the housing 12.

The start nipple 12 includes a plurality of steps including a lead-in step 36 (FIG. 2), a first shelf portion 38, a second shelf portion 40 and a locking groove 42. Intermediate to all of these portions are tapered transitions so that each step portion has a tapered transition to the next step portion.

The coupling member 32 and the housing member 26 are interconnected by the use of a plurality of screw members 44. In particular, the coupling member 32 and the housing member 26 respectively include outwardly extending interlocking flange portions 27 and 33 and the screw members 44 are positioned through the flange portions. In addition to supporting the locking balls 34, the coupling member 32 also includes recesses to support an O-ring 46 and a valve actuating ring 48.

The housing member 26 supports the valve assembly 25 including two (2) vane members 50 mounted on shafts 52. The vane members 50 are spring loaded by biasing means such as torsion springs 54 to the position shown in FIG. 2. A collar spring assembly generally indicated at 55 is disposed intermediate the outer collar 16 and the coupling member 32. The collar spring assembly 55 includes a helical collar spring 56 which is positioned between washers 58 and 60.

A locking washer 62 within a groove in the coupling member 32 acts as a stop for the washer 60. In addition, the collar 16 includes an attached flange portion 64 having a step 66 with tapered sides to cooperate with the locking balls 34 for locking and unlocking. The collar 16 also includes a bearing member 68 to allow for slidable movement between the collar 16 and the coupling member 32.

The coupling assembly 10 is designed to mate with the start nipple 12 and is of the type generally referred to as a push-to-engage and pull-to-release coupling. FIG. 2 illustrates the coupling assembly 10 prior to engagement with the start nipple 12. FIG. 3 illustrates the coupling assembly fully seated on the start nipple 12. When this occurs, the vane members 50 are rotated outwardly to open the passageway through the housing member 26, the coupling member 32 and the start nipple 12.

The locking of the coupling assembly 10 on the start nipple 12 may be seen from a comparison in the position of the various members in FIG. 2 and the position of these members in FIG. 3. It also may be seen from a comparison of the positions of these members in FIGS. 2, 3, 4 and 5 of U.S. Pat. No. 4,586,694.

FIG. 2 of this application illustrates the coupling assembly 10 prior to its engagement with the start nipple 12. FIG. 3 illustrates the coupling assembly 10 fully seated on the start nipple 12. In this position, the locking balls 34 are disposed within the groove 42 in locked relationship with the groove.

At the same time that the coupling assembly 10 is fully seated on the start nipple 12, the vane members 50 are rotated outwardly to open the passageway through the coupling assembly and the start nipple for the passage of high pressure air flow. The engagement of the coupling assembly 10 with the start nipple 12 therefore automatically opens the vane members 50 which form the two (2) halves of a clam shell type restrictor valve. When the vanes 50 are in the open position as shown in FIG. 3, this provides a full diameter unrestricted flow area through the coupling assembly. The full diameter flow path is provided since the housing 26 has an enlarged portion 67 which has a larger internal diameter than the internal diameter of the start nipple 12.

When rotated outwardly, the vane members 50 fit within the enlarged portion 67 of the housing 26 and provide an interior surface having a diameter approximately the same as the internal diameter of the start nipple 12. This can be seen in FIG. 3 wherein a substantially unrestricted and continuous flow area is formed from the source of high pressure air through the hose 28 (FIG. 1) and in turn through the coupling assembly 10 to the start nipple 12. The use of the enlarged portion 67 in the housing member 26 thereby provides for a substantial continuation of the flow path and, since there is no internal restriction to the flow path, this reduces the possibility of any standing waves being formed in the flow path.

The actuation of the vane members 50 is accomplished through the use of the valve actuating ring 48. In particular, the valve actuating ring 48 is engaged by the end portion 36 of the start nipple 12. The ring 48 is pushed to engage against actuating surfaces 70 formed at the inner ends of the vanes 50. The actuating surfaces 70 of the vanes 50 cooperate with the flat end surface 72 of the valve actuating ring 48 to produce a smooth rotational movement of the vanes 50 in accordance with the linear movement of the valve actuating ring 48. In particular, the profiles of the rounded actuating surfaces 70 cooperate so that there is an equal angular or rotational movement of the vane 50 with each incremental movement of the actuating ring 48. The rounded actuating surfaces 70 of the vanes 50 are shown on an enlarged basis in FIG. 7 of U.S. Pat. No. 4,586,694.

The surfaces 70 and 72 do not slide relative to each other but rather rotate relative to each other so that any lubricant between these surfaces is not scraped off as would occur with a sliding motion. This provides for a greater service life than the coupling assemblies of the prior art. In addition, because of the equal angular or rotational movement of the vane 50 with each incremental linear movement of the actuating ring 48, this produces a smooth motion for the vanes 50 as they are opened and closed. In the prior art, the valve members could have quick rapid movements when actuated, which quick movements could cause damage to the valve assembly when opening and closing.

In particular, the coupling member 32 is slid over the start nipple 12 until the locking balls 34 meet the sloping portion intermediate the sections 38 and 40 of the start nipple 12. The coupling assembly 10 is pushed to the left in FIG. 2 with sufficient force so that the collar 16 is moved to the left. This tends to compress the helical spring 56 since the bearing member 68 engages the washer 58 and this engagement turn provides for the compression of the spring 56.

At the same time, the movement of the collar 16 allows the locking balls 34 to move to the left along the left sloping side of the step portion 66 to the position where the locking balls engage the groove 42. The collar 16 is now free to move to the right because of the force imposed by the helical spring 56. The coupling assembly 10 is now fully seated on the start nipple 12 and the various members are in the position shown in FIG. 3. In this position, the locking balls 34 are fully seated and locked in position in the groove 42 and the two (2) vane members 50 of the valve assembly 25 are fully open to provide an unrestricted flow of pressurized air through the coupling assembly 10 along substantially the complete inner diameter of the start nipple 12. The flow path along substantially the complete inner diameter of the start nipple 12 is provided because the housing 26 has an enlarged portion 67 which has a large internal diameter than the internal diameter of the start nipple 12.

When it is desired to remove the coupling assembly 10, the coupling assembly is disengaged by pulling back on the handles 18. When the handles 18 are pulled back, the flange portion 64 engages the washer 60 to again compress the spring 56 and also to allow the locking balls 34 to move along the other sloping side of the step portion 66 so that the coupling assembly 10 may be pulled away from the start nipple 12. When the coupling member 10 is disengaged, the vane members 50 close automatically as a safety feature to prevent any dangerous whipping of the hose 28 and the coupling assembly 10 if air pressure is still present in the hose 28. It should be appreciated that the air pressure should normally be disconnected prior to disengagement of the coupling assembly 10 from the start nipple 12. However, the automatic closing of the valve assembly 25 provides for a safety feature to prevent any whipping of the hose 28.

In the improved apparatus of this invention, a plurality of prongs 100 extend from the left end of the coupling assembly 10 in a direction toward the start nipple 12. There may illustratively be five (5) prongs equally spaced around the periphery of the coupling assembly. However, it will be appreciated that any suitable number of the prongs 100 may be provided.

A pair of vane members 102 in a valve assembly generally indicated at 103 may be disposed in the start nipple 12. The valve assembly 103 may correspond in construction to the valve assembly 25. The vane members 102 may be disposed in the start nipple 12 in a manner similar to the disposition of the vane members 50 in the coupling assembly 10. However, the vane members 102 in the start nipple 12 face in a direction opposite to the vane members 50 in the housing 26.

The vane members 102 become opened simultaneously with the opening of the vane members 50 as a result of the action of the prongs 100 against these vane members. The simultaneous opening of the vane members 50 and 102 provides an additional safety factor in the operation of the apparatus of this invention. This results from the fact that air under pressure is normally prevented from flowing by the simultaneous closing of both the vane members 50 and the vane members 102 and that air under pressure can flow through the apparatus only by the simultaneous opening of such vane members.

This invention therefore provides for an improved assembly for coupling ground equipment, such as a source of pressurized air, to an aircraft for starting the aircraft engines. This invention provides an unrestricted air flow without standing waves by a clam shell type restrictor valve assemblies 25 and 103 each having two (2) vanes which open in an enlarged section so as to provide for a continuous flow path through the housing 12, the coupling member 32 and the start nipple 12. In addition, the vane members 50 and 102 are opened and closed smoothly with no abrupt movements which could damage the vane members during such opening and closing. The locking and unlocking of the coupling assembly to the start nipple 12, and the unlocking of the coupling assembly 10 from the start nipple 12, are provided automatically through the use of a push-to-engage, pull-to release action. This is accomplished with a minimum of parts and with a greater resistance to handling damage than in the prior art devices.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. Apparatus for coupling to an aircraft a high pressure air flow produced by ground equipment, including:

housing means having first and second ends and providing for a coupling of the first end to the ground equipment, at least a first vane member disposed within the housing and movable between open and closed positions and connected to the housing means for rotation between the open and closed positions, a start nipple disposed in the aircraft, coupling means disposed in slidably coupled relationship to the housing means for providing an opening and closing of the first vane member in accordance with the slidable disposition of the coupling means relative to the housing means, at least a second vane member disposed in the start nipple and movable between open and closed positions; and actuating means extending from the coupling means into the start nipple for actuating the at least second vane member between the open and closed positions in accordance with the actuation of the at least first vane member between the open and closed positions.

2. Apparatus as set forth in claim 1 wherein each of the at least first and second vane members is rotatable between the open and closed positions and wherein the actuating means actuates the at least second vane member to the open position in synchronism with the actuation of the at least first vane member to the open position by the coupling means.

3. Apparatus as set forth in claim 1 wherein first biasing means is included in the housing means for biasing the at least first vane member to the closed position, and second biasing means is included in the housing means for biasing the at least second vane member to the closed position.

4. Apparatus as set forth in claim 1 wherein detent means are disposed in the coupling means and the start nipple in a co-operative relationship to retain the at least first and second vane members in the open positions.

5. Apparatus for coupling to an aircraft a high pressure air flow produced by ground equipment, including, housing means constructed to be coupled to the ground equipment, at least a first vane member disposed in the housing means and movable between open and closed positions and biased to the closed position, a start nipple constructed to be coupled to the aircraft, at least a second vane member disposed in the start nipple and movable between open and closed positions and biased to the closed position, and coupling means slidably disposed relative to the housing means and constructed to be disposed in a coupled relationship with the start nipple in accordance with the slidable movement of the coupling means relative to the housing means to obtain simultaneous operations of the coupling means on the least first and second vane members to move the at least first and second vane members simultaneously to the open positions.

6. Apparatus as set forth in claim 5, including, the at least first vane member being operatively coupled to the housing means for rotation by the coupling means between the open and closed positions, and the at least second vane member being operatively coupled to the start nipple for rotation by the coupling means between the open and closed positions.

7. Apparatus as set forth in claim 5, including:

the coupling means including first means movable into the housing means to move the at least first vane member from the closed position to the open position and including second means movable into the start nipple simultaneously with the movement of the first means into the housing means to move the at least second vane member to the open position.

8. Apparatus as set forth in claim 7, including, the first means including a ring disposed on the coupling means in co-operative relationship with the at least first vane member and movable with the coupling means to move the at least first vane member from the closed position to the open position and including prongs extending from the coupling means to at least the second vane member to move the at least second vane member from the closed position to the open position.

9. Apparatus as set forth in claim 8, including, the at least first vane member being operatively coupled to the housing means for rotation by the ring between the open and closed positions, and the at least second valve member being operatively coupled to the start nipple for rotation by the prongs between the open and closed positions.

10. Apparatus for coupling to an aircraft a high pressure air flow produced by ground equipment, including, housing means constructed to be coupled to the ground equipment, at least a first vane member disposed in the housing means and movable between open and closed positions and normally disposed in the closed position, a start nipple constructed to be coupled to the aircraft, at least a second vane member disposed in the start nipple and movable between open and closed positions and normally disposed in the closed positions, and coupling means disposed in a co-operative relationship with the housing means between the at least first vane member and the at least second vane member and movable relative to the housing means and the start nipple for operating simultaneously on the at least first vane member and the at least second vane member to open the at least first vane members and the at least second vane member.

11. Apparatus as set forth in claim 10, including, the at least first vane member constituting a first pair of vane members disposed in a clam shell relationship to move simultaneously relative to each other to the open position and simultaneously to the closed position, and the at least second vane member constituting a second pair of vane members disposed in a clam shell relationship to move simultaneously relative to each other to the open position and simultaneously relative to each other to the closed position.

12. Apparatus as set forth in claim 10, including, the at least first vane member being rotatable and the least second vane member being rotatable, means in the coupling means for rotating the first vane member in accordance with the movement of th e coupling means relative to the housing means, and means in the coupling means for rotating the second vane member in accordance with the movement of the coupling means relative to the start nipple.

13. Apparatus as set forth in claim 10, including, bias means for positioning the coupling means in a particular relationship to the housing means for maintaining the at least first vane member and the at least second vane member open, and detent means in the coupling means and the housing means for maintaining the particular relationship between the coupling means and the housing means.

14. Apparatus as set forth in claim 13 wherein the bias means includes a spring disposed between the coupling means and the housing means for becoming constrained in accordance with the relative movements between the coupling means and the housing means, and wherein the detent means includes a socket in one of the starter nipple and the coupling means and a ball disposed in the socket and bearing means on the other one of the start nipple and the coupling means for bearing against the ball in the socket.

15. Apparatus as set forth in claim 11, including, the at least first vane member being rotatable relative to the housing and the least second vane member being rotatable relative to the start nipple, means in the coupling means for rotating the first pair of vane members in accordance with the movement of the coupling means relative to the housing means, and means in the coupling means for rotating the second pair of vane members in accordance with the movement of the coupling means relative to the start nipple, bias means for positioning the coupling means in a particular relationship to the housing means for maintaining the first pair of vane members open and the second pair of vane members open, detent means in the coupling means and the housing means for maintaining the particular relationship between the coupling means and the housing means, the bias means including a spring disposed between the coupling means and the housing means for becoming constrained in accordance with the relative movements between the coupling means and the housing means, and the detent means including a socket in one of the starter nipple and the coupling means and a ball disposed in the socket and bearing means the other one of the start nipple and the coupling means for bearing against the ball in the socket.

16. Apparatus for coupling to an aircraft a high pressure air flow produced by ground equipment, including, housing means having a hollow configuration and having first and second ends and constructed to provide for a coupling to the ground equipment to the housing at the first end of the housing means for the flow of the high pressure air from the ground equipment through the housing means, coupling means having a hollow configuration and disposed within the housing means at the second end of the housing means, a first clam shell valve defined by a pair of members disposed within the housing means and attached to the housing means and rotatable relative to the housing means between open and closed relationships, a start nipple having a hollow configuration and constructed to be disposed within the coupling means, a second clam shell valve having a hollow configuration defined by a second pair of members disposed within the start nipple and attached to the start nipple and rotatable relative to the start nipple between open and closed relationships, and first means disposed in co-operative relationship with the coupling means for operation on the first clam shell valve to open the first clam shell valve, and disposed in cooperative relationship with the start nipple for operation on the second clam shell valve to open the second clam shell valve, when the coupling means is moved relative to the housing means and the start nipple to dispose the start nipple within the coupling means, thereby to provide for the flow of the high pressure air into the aircraft.

17. Apparatus as set forth in claim 16 wherein the first pair of members in the first clam shell valve are operatively coupled to the housing means within the housing means for rotation within the housing means between the open and closed positions and wherein the first means includes a third member linearly movable against the first pair of members to open the first valve when such first means is moved relative to the housing means and the start nipple to dispose the start nipple within the coupling means and wherein the second pair of members in the second clam shell valve are operatively coupled to the start nipple within the start nipple for rotation within the start nipple between the open and closed positions and wherein the first means includes at least a fourth member linearly movable against the second pair of members to open the second valve when such first means is moved relative to the start nipple to dispose the start nipple within the coupling means.

18. Apparatus as set forth in claim 17 wherein the third member is disposed relative to the members in the first pair, and the members in the first pair are shaped, to provide an equal rotational movement of the members in the first pair for each incremental movement of the first member and wherein the at least fourth member is disposed relative to the members in the second pair, and the members in the second pair are shaped, to provide an equal rotational movement of the members in the second pair for each incremental movement of the fourth member.

19. Apparatus as set forth in claim 18 wherein the third member is a ring and the fourth member is at least one prong extending from the coupling means.

20. Apparatus for coupling to an aircraft a high pressure air flow produced by ground equipment, including, a first valve defined by a first pair of members movable between open and closed positions and having a clam shell relationship to each other in the closed position, a second valve defined by a second pair of members movable between open and closed positions and having a clam shell relationship to each other in the closed position, first hollow means for supporting the members in the first pair within the first hollow means with such members disposed in a first direction in the clam shell relationship, second hollow means for supporting the members in the second pair within the second hollow means with such members disposed in the clam shell relationship in a second direction opposite to the first direction, and third hollow means disposed between the first and second valves and disposed within the first hollow means and positionable to receive the second hollow means and movable relative to the first and second hollow means to open the first valve in the first direction at the same time that it opens the second valve in the second direction.

21. Apparatus as set forth in claim 20, including, means included in the second and third hollow means for locking the second hollow means in a fixed position relative to the third hollow means to maintain the first and second valves in the open positions.

22. Apparatus as set forth in claim 20, including, means disposed relative to the first valve and the first hollow means for biasing the first valve to the closed position, and means disposed relative to the second valve and the second hollow means for biasing the second valve to the closed position.

23. Apparatus as set forth in claim 20, including, the second hollow means having a configuration relative to the third hollow means to provide for a removal of the second hollow means from the third hollow means in a linear direction to close the first and second valves.

24. Apparatus as set forth in claim 20, including, the third hollow means being movable linearly in a first direction relative to the first and second hollow means to open the valves and being movable linearly in a second direction opposite to the first direction to close the valves.

25. Apparatus as set forth in claim 24, including, the third hollow means being movable in a particular direction to open the first and second valves, the second hollow means having progressive decreases in dimensions in a second direction transverse to the particular direction to facilitate the movement of the third hollow means linearly in the particular direction relative to the second hollow means.

26. Apparatus as set forth in claim 20, including, means associated with the first valve and the first hollow means for biasing the first valve to the closed position, and means associated with the second valve and the second hollow means for biasing the second valve to the closed position.

27. Apparatus as set forth in claim 26, including, means included in the second and third hollow means for locking the second hollow means in a fixed position relative to the third hollow means to maintain the first and second valves in the open positions, the second hollow means having a configuration relative to the third hollow means to provide for a removal of the second hollow means from the third hollow means in a linear direction to close the first and second valves.

28. Apparatus as set forth in claim 20 wherein the third hollow means is disposed relative to the members in the first pair, and the members in the first pair are shaped, to provide equal rotational movements of such members for incremental movements of the third hollow means relative to the second hollow means, and the third hollow means is disposed relative to the members in the second pair, and the members in the second pair are shaped, to provide equal rotational movements of such members for incremental movements of the third hollow means relative to the second hollow means.

29. A coupling assembly for coupling high pressure air flow produced by ground equipment to a start nipple having an interior diameter of a particular dimension contained on an aircraft, including, a housing member having first and second ends and having an enlarged section with an interior diameter of a dimension greater than the particular diameter of the start nipple and with the housing member having the first end adapted for coupling to the ground equipment, the housing member having pivot positions at opposite sides of the housing member, an actuating ring located adjacent the second end of the housing, a first pair of vane members forming a clam shell type restrictor valve and located within the enlarged section of the housing member and rotatable on pivot positions at the opposite sides of the housing member and with the first pair of the vane members in a closed position blocking the high pressure air flow through the coupling assembly and with the first pair of the vane members in an open position forming a continuation of the interior diameter of the start nipple to form a continuous air flow path through the coupling assembly and the start nipple and with each vane member in the first pair having a shape to include actuating surfaces for receiving actuation forces from the actuation ring and with the shape of each vane member in the first pair providing the actuating surfaces located in front of, and displaced from, the pivot positions, and said actuating ring being positioned intermediate the vane members in the first pair and the start nipple when the coupling assembly is coupled to the start nipple and the start nipple is engaging the actuating ring to move the actuating ring into engagement with the actuating surfaces of the vane members in the first pair to open the vane members in the first pair, a locking assembly coupled to the second end of the housing member and constructed for coupling to and locking on the start nipple, a second pair of vane members disposed within the start nipple and having a construction corresponding to the construction of the first pair of vane members and movable between open and closed positions, and actuating means extending from the coupling assembly for actuating the second pair of the vane members to the open position simultaneously with the actuation of the first pair of vane members to the open position by the actuating ring.

30. The coupling assembly of claim 29 wherein the vane members in the first and second pairs are normally spring loaded to the closed position to provide for a return of such vane members to the closed positions upon the disengagement of the coupling assembly from the start nipple.

31. The coupling assembly of claim 29 wherein the actuating surfaces of the vane members in the first pair have a rounded cam configuration in combination with the actuating ring to provide for substantially equal angular movements of the vane members in the first pair upon incremental movements of the actuating ring and wherein the vane members in the second pair have a rounded cam configuration in combination with the at least one prong to provide for substantially equal angular movements of the vane members in the second pair upon incremental movements of the at least one prong.

32. The coupling assembly of claim 29 wherein the start nipple includes a circumferentially spaced groove and wherein the locking assembly includes a coupling member including a number of circumferentially spaced openings for receiving and supporting individual locking balls, the coupling member being connected to the second end of the housing member and having an interior dimension to receive the start nipple to have the locking balls positioned within the exterior circumferential locking groove on the start nipple, and wherein the locking assembly additionally includes;

a spring loaded collar coupled to and enveloping the coupling member and slidable relative to the coupling member between locking and unlocking positions and normally in the locking position for maintaining the locking balls in the locking groove and movable to the unlocking position to allow the entry of the locking balls into, or the exit of the locking balls from, the locking groove upon the application of a sliding force to the collar.

33. A coupling assembly as set forth in claim 29 wherein the first pair of vane members face in a first direction and wherein the second pair of vane members face in a second direction opposite to the first direction.

34. A coupling assembly as set forth in claim 29 wherein the actuating means extending from the coupling member includes a plurality of prongs substantially equally spaced from one another.

35. A coupling assembly for coupling high pressure air flow provided by ground equipment to a start nipple having an exterior circumferential locking groove contained on an aircraft, including, a housing member having first and second ends and having the first end adapted for coupling to the ground equipment, an actuating ring located adjacent the second end of the housing, a first pair of vane members disposed in the housing member for rotation within the housing member relative to pivot positions and movable between open and closed positions and blocking, in the closed position, the high pressure air flow through the coupling assembly and providing, in the open position, a continuous air flow path through the coupling assembly and the start nipple and having shapes providing actuating surfaces located in front of, and displaced, from the pivot positions for receiving actuating forces from the actuating ring, and said actuating ring being positioned intermediate the vane members in the first pair and the start nipple when the coupling assembly is coupled to the start nipple and the start nipple engages the actuating ring to move the actuating ring into engagement with the actuating surfaces of the vane members to open the vane members, a locking assembly coupled to the second end of the housing member and including a coupling member including a number of circumferentially spaced openings for receiving and supporting individual locking balls and connected to the second end of the housing member and having an interior dimension to receive the start nipple to have the locking balls positioned within the exterior circumferential locking groove on the start nipple and the locking assembly additionally including a spring loaded sliding collar coupled to and enveloping the coupling member and slidable relative to the coupling member between the locking and unlocking positions and normally disposed in the locking position for maintaining the locking balls in the locking groove and movable to the unlocking position to allow the entry or exit of the locking balls into the locking groove, or the exit of the locking balls from the locking groove, upon the application of a force to the collar to provide the sliding movement of the collar, a second pair of vane members disposed within the start nipple and having a construction corresponding to the construction of the first pair of vane members and movable between open and closed positions, and actuating means extending from the coupling assembly for actuating the second pair of the vane members to the open position simultaneously with the actuation of the first pair of vane members to the open position by the actuating ring.

36. A coupling assembly as set forth in claim 35 wherein the start nipple has an interior diameter of a particular value and wherein the housing member includes an enlarged hollow section with an interior diameter of a dimension greater than the particular value and where the vane members in the first pair form a first clam shell type restrictor valve disposed within the enlarged hollow section of the housing member and the vane members in the first pair are rotatable relative to pivot positions on the interior in the hollow section of the housing member and wherein the start nipple has a hollow section and wherein the vane members in the second pair form a second clam shell type restrictor valve disposed within the hollow section of the start nipple and the vane members in the second pair are rotatable relative to pivot positions in the hollow section of the start nipple.

37. A coupling assembly as set forth in claim 35 wherein the actuating surfaces of the vane members in the first pair have rounded cam configurations operable in conjunction with the actuating ring to provide for substantially equal angular movements of the vane members in the first pair in response to incremental movements of the actuating ring and wherein the actuating surfaces of the vane members in the second pair have rounded cam configurations operable in conjunction with the actuating means to provide for substantially equal angular movements of the vane members in the second pair in response to incremental movements of the actuating means.

38. A coupling assembly as set forth in claim 35 wherein the vane members in the first pair are disposed in the member for rotation in a first direction to the open position and wherein the vane members in the second pair are disposed in the start nipple for rotation to the open position in a second direction opposite to the first direction.

39. A coupling assembly as set forth in claim 38 wherein the actuating means extending from the coupling member includes a plurality of prongs substantially equally spaced from one another in an annular direction.

* * * * *